Feb. 7, 1967 I. J. P. JAMES ETAL 3,303,277

COLOUR TELEVISION RECEIVER INCLUDING CLIPPER CORRECTION MEANS

Filed March 24, 1964 2 Sheets-Sheet 1

Feb. 7, 1967 I. J. P. JAMES ETAL 3,303,277

COLOUR TELEVISION RECEIVER INCLUDING CLIPPER CORRECTION MEANS

Filed March 24, 1964

2 Sheets-Sheet 2

United States Patent Office 3,303,277
Patented Feb. 7, 1967

3,303,277

COLOUR TELEVISION RECEIVER INCLUDING CLIPPER CORRECTION MEANS

Ivanhoe John Penfound James and John Edward Best, London, England, assignors to Electric & Musical Industries Limited, Hayes, England, a British company Filed Mar. 24, 1964, Ser. No. 354,285
Claims priority, application Great Britain, Apr. 4, 1963, 13,462/63; May 18, 1963, 19,856/63
8 Claims. (Cl. 178—5.4)

Figure 1:
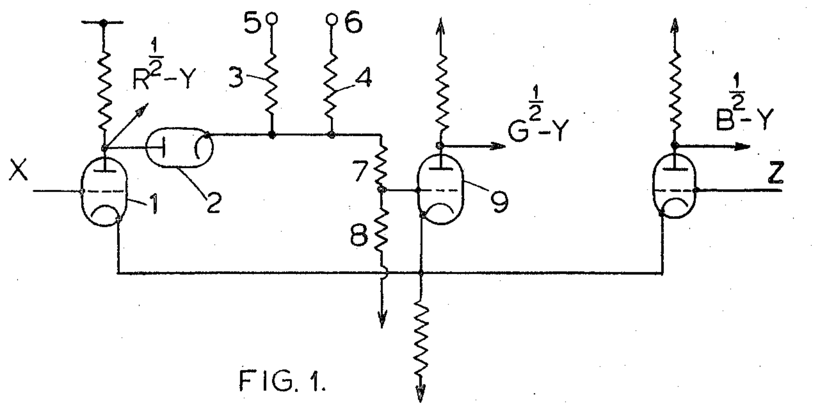

This invention relates to colour television receivers and in particular to matrixing circuits for deriving the colour component signals for application to the cathode ray colour reproducing tube.

Advantages can be obtained by generating and transmitting from a colour waveform comprising three signals which can be denoted as:

$$Y,\ R^{1/\gamma}-Y,\ B^{1/\gamma}-Y$$

the two latter signals being the colour difference signals and Y being the direct luminance signal and having the form $$Y=(aR+bR+cF)^{1/\gamma}$$

$a$, $b$ and $c$ being the luminosity coefficients 0.30, 0.11, 0.59 respectively.

However when such a waveform is received by a receiver using linear matrixing circuits as in a N.T.S.C. type receiver difficulty is encountered in deriving the green colour signal.

The red and blue components can be derived at the receiver simply and exactly by adding Y to the respective colour difference signals which is usually done at the picture reproducing tube. The green component can however only be derived exactly by non-linear matrixing which is too complex and expensive for use in a broadcast receiver and an object of the invention is to use the type of matrixing for the production of the green colour signal as employed in N.T.S.C. type receivers, circuits being included to provide a satisfactory correction for the green error that otherwise ensues.

According to the present invention there is provided colour television apparatus for providing electrical signals capable of reproducing a colour picture, comprising (a) a circuit in which are provided signals dependent on Y, R, G and B where Y is a signal representing the luminance and R, G and B are signals representing the red, green, and blue components respectively,
(b) means providing a further signal representing the difference between two of said signals, Y, R, G and B,
(c) means for clipping said further signal to provide a correcting signal,
(d) means for adding said correcting signal to one of the signals R, G, and B to alter the colour balance of a picture reproduced from said first-mentioned signals.

The green error is known to have the value $$1.7(Y-Y')$$

which is the extent by which the matrix output $G_1{}^{/\gamma}-Y$ exceeds the correct value, Y′ being the N.T.S.C. form of the luminance signal which is equal to $$aR^{1/\gamma}+bG^{1/\gamma}+cB^{1/\gamma}$$

On the asumption that $\gamma$ can be taken as 2 the luminance difference $Y-Y'$ can be represented according to $$Y-Y'=\frac{x}{Y+Y'}$$

$$x=ab(R^{1/2}-B^{1/2})^2+bc(B^{1/2}-G^{1/2})^2+ca(G^{1/2}-R^{1/2})^2$$

While it would be desirable to provide correction for the green error over the whole area of the colour triangle the error is most objectionable in the vicinity of the red primary and it is advisable to provide correction in this region at least. On the basis of the immediately preceding derivation for the green error the error in the immediate vicinity of the red primary is $$a^{1/2}(1-a^{1/2})R^{1/2}$$

Away from the vicinity of the red primary (or more accurately) the green error can be shown to be given approximately by $$(1-p)a^{1/2}(1-a^{1/2})r^{1/2}$$

in which $p$ is the proportion of green to red as given by $G^{1/2}/R^{1/2}$. The blue component is also present in the error but its contribution to the error is smaller.

Plainly it is desirable to add to the green signal in the general vicinity of the red primary some signal which is proportional to $R^{1/2}$ and which is also dependent to some extent upon the green proportion present. In one embodiment of the invention use is made of the $R^{1/2}-Y$ signal for the purpose. This signal is conveniently available and is known to be zero at the white point and to increase to the value $$(1-a)^{1/2}R^{1/2}$$

at the red primary. In the region of the red primary it can be represented with sufficient accuracy as $$(1-p^2)^{1/2}(1-a)^{1/2}R^{1/2}$$

On the side of the white point away from the red primary it becomes negative and it is proposed by the use of a limiter to employ only positive portions of the signal.

More accurate correction is obtained if the contribution to the error of the blue colour signal is also taken into account. In a second embodiment of the invention a correction signal dependent on the positive portions of both the red difference signal and the blue difference signal is used.

Figure 2:
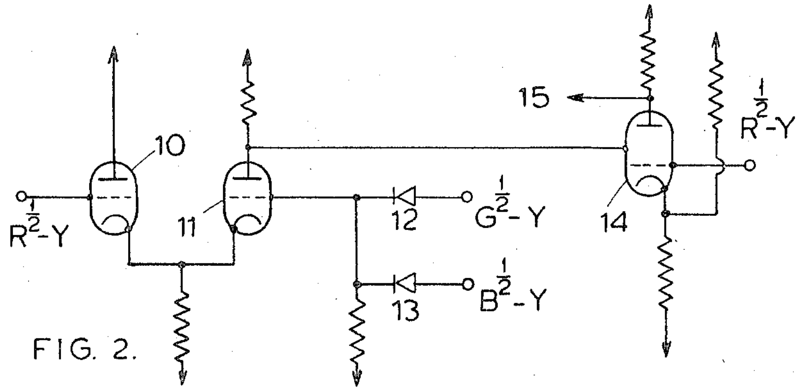
Figure 3:
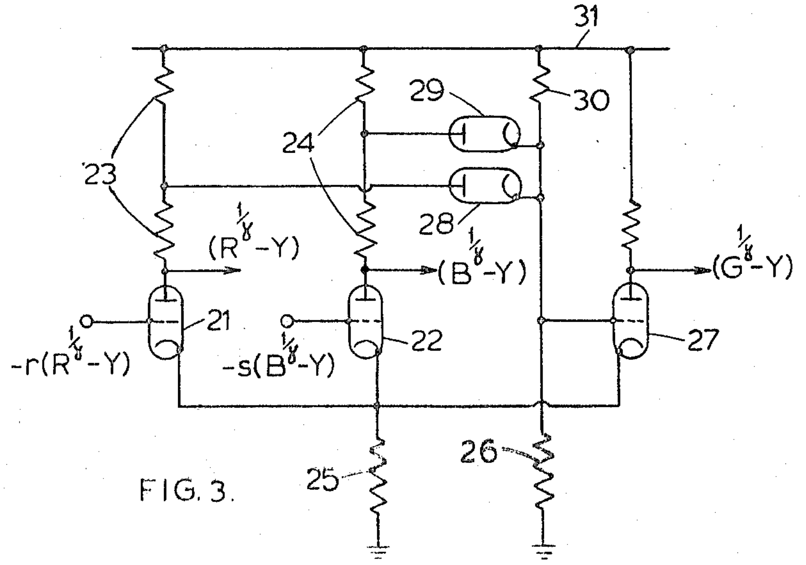
Figure 4:
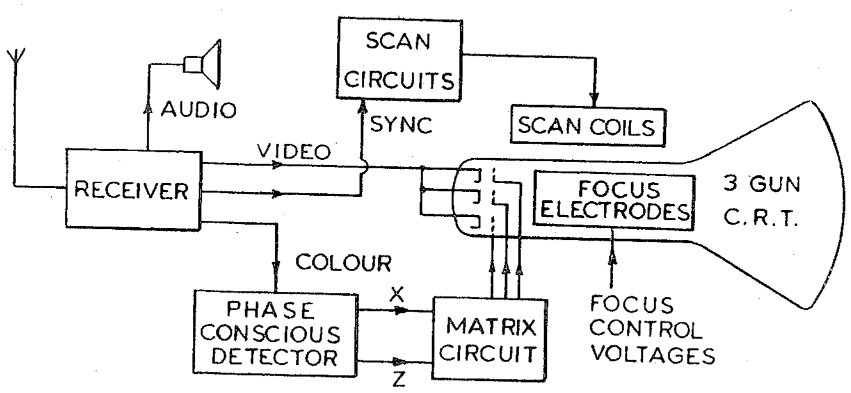

In order that the invention may be clearly understood and readily carried into effect, it will now be more fully described with reference to the acompanying drawings, in which:

FIGURE 1 illustrates the correcting components of a matrixing circuit for a colour television receiver according to one example of the present invention, FIGURE 2 illustrates an alternative to the correcting circuit of FIGURE 1, FIGURE 3 shows another example of a correcting circuit according to the invention, and FIGURE 4 shows in simple block form a colour television receiver to the matrixing circuits of which the correction circuits of the invention can be added.

Referring to the drawings it will be assumed that each of the correcting circuits which are illustrated are embodied in a colour television receiver having a so-called XZ detecting and matrixing circuit such as that illustrated in FIGURE 9.27, page 246 of "Colour Television; N.T.S.C. System Principles and Practice" by Carnt & Townsend, published by Iliffe Book Ltd., in 1961. Such a detecting and matrixing circuit has three cathode coupled valves which form the green colour difference signal. In accordance with the invention such a circuit is modified to correct the green colour difference signal which would otherwise be formed incorrectly if the received signals are, as indicated $$Y,\ R^{1/\gamma}-Y,\ \text{and}\ B^{1/\gamma}-Y$$

Thus in accordance with the example of the invention shown in FIGURE 1 the anode of the red colour difference valve 1 which is the X valve of the three cathode coupled valves, is connected to a diode limiter 2 set to clip at zero value of the red colour difference signal or at some level above this value. The clipping level is set by the resistors 3 and 4 connected between D.C. supply terminals 5 and 6. The clipped signals are fed in suitable proportion by means of a potential divider 7, 8 to the grid of the green colour difference valve 9. The output from this valve is then error corrected in the general neighbourhood of the red primary.

In FIGURE 2 there is shown an alternative circuit arrangement according to the same example of the invention in which a long tailed pair circuit comprising valves 10 and 11 is switched into one or other of its conducting/non-conducting conditions depending on the relative magnitude of red colour difference signals fed to one grid as compared with green or blue colour difference signals fed to the other grid. The greater positive signal is selected from the green and blue colour difference signals by the diodes 12 and 13. A switching waveform set up by this procedure is then used to gate a valve 14 to the control grid of which is fed the red colour difference signal. The switching waveform may be applied as indicated to the screen grid of the valve 14 and the green correction signal derived at 15 from the anode of the valve 14 is suitably mixed in with the green colour difference signal from the XZ circuit no part of which is shown. The XZ circuit conveniently provides the inputs to the long tailed pair circuit 10, 11 and to the gated valve 14. The gated valve 14 may be arranged to be just non-conducting for zero values of the red colour difference signal applied to its control grid.

By using two circuits similar to that shown in FIGURE 2 operating similarly in regard to the blue and green primaries the whole area of the colour triangle may be compensated for green error.

By this means it is possible to increase the accuracy of the correction compared with that which would be obtained for example by an arrangement such as described above.

In another example of the present invention correction dependent upon positive portions of the blue difference signal is carried out by means of a circuit which is similar to that illustrated in FIGURE 1. However, the circuit comprising components such as those denoted by the references 2 to 8 of FIGURE 1 is connected to the Z valve of the three cathode coupled valves of the XZ detecting and matrixing circuit.

In the example of the invention being described, a correcting circuit comprising components 2 to 8 is moreover also associated with the X valve of the circuit, the two correcting signals being applied to the control electrode of the valve 9 which generates the $G^{1/\gamma}-Y$ signal.

With the correcting circuit incorporated as described, the effect is to provide a correction for the green error in the vicinity of both the red and blue primary colours. To prevent excessive correction for purples, for which both correcting circuits may be simultaneously operative, the bias of the two diodes connected to the anodes of the X and Z valves may be suitably adjusted.

In yet another form of the invention, the correcting signal may be obtained by means of a circuit which operates to produce a signal representing the modulus of $$R^{1/\gamma}-B^{1/\gamma}$$

The last mentioned signal can be derived by subtracting the blue colour difference signal from the red colour difference signal. For example the signals $R^{1/\gamma}-Y$ and $B^{1/\gamma}-Y$ may be applied respectively to the control electrodes of two cathode coupled valves, with diodes arranged to select the more positive signal appearing at the anodes of these valves.

It may also be desirable in accordance with the invention to make provision for correction for the green error not only by subtracting from it signals which are largely dependent upon positive portions of the red and blue difference signals, but also by subtracting from it a signal which is zero for white and grey elements of the picture to be reproduced and which increases as the product of saturation and luminance increases. The last mentioned signal is obtained, in the form of the invention being considered, by detecting the amplitude of the received chrominance signal, namely the oscillation which is modulated in phase quadrature by the red and blue difference signals. The output of the detecting process can be shown to have the required property. In this form of the invention the correction based on detecting the amplitude of the chrominance signal provides general correction over the whole area of the colour triangle, and the correction dependent upon positive portions of the red and blue difference signals reduces residual errors which would otherwise remain in the red and blue corners of the colour triangle. In this form of the invention a very close approximation to the correct green signal for the colour reproducing tube can be achieved with simple and inexpensive correcting means.

Alternatively, the correction in response to the red and blue colour difference signals can be improved by passing the positive portions of the colour difference signals through a non-linear circuit such as a squaring circuit, before subtraction from the green signal.

Correction may also be made according to the invention by clipping the green difference signal at a predetermined level and by subtracting a proportion of the output of the difference signal from the green signal which would otherwise be formed. This correction may be used with any other combination of corrections.

The invention is applicable to receivers adapted to demodulate the colour sub carrier along axes different from the X and Z axes. FIGURE 3 illustrates a circuit for deriving a corrected $G^{1/\gamma}-Y$ waveform from signals proportional to $R^{1/\gamma}-B^{1/\gamma}-Y$, which signals may be obtained by synchronous demodulation of an N.T.S.C. type chrominance signal along the appropriate axes, or in the case of SECAM directly by detecting the $R-Y$ and $B-Y$ signals or otherwise. The circuit comprises two valves 21 and 22 to the control electrodes of which are applied respectively signals represented by expressions:

$$-a(R^{1/\gamma}-Y) \text{ and } -b(R^{1/\gamma}-Y)$$

where $a=0.30/0.59$ and $b=0.11/0.50$. Corresponding signals but of positive sense are generated across the anode load resistors 23 and 24 whilst there is generated across the common cathode resistor 25 a voltage represented by $$-a(R^{1/\gamma}-Y)-b(R^{1/\gamma}-Y)$$

which is equal to $(G^{1/\gamma}-Y)$. This voltage is fed to the cathode electrode of valve 27. The control electrode of valve 27 is connected via diodes 28 and 29 to tapping points on the anode resistors 23 and 24. There is therefore applied between the control electrode and cathode of the valve 27 suitable proportions of positive portions of both the signals $$(R^{1/\gamma}-Y) \text{ and } (B^{1/\gamma}-Y)$$

The threshold level of the diodes 28 and 29 is determined by resistor 30 which is taken to the anode voltage bus bar 31 and resistor 26. The resultant signal generated across the anode load resistor of the valve 27 represents $G^{1/\gamma}-Y$ with adequate accuracy, notwithstanding the fact that Y is a true luminance signal.

FIGURE 4 shows in block diagrammatic form a colour television receiver of a type capable of receiving the N.T.S.C. colour television signal and in which the green colour correction circuits described above can be incorporated in the matrixing circuits. Apart from the green correction circuit such a receiver is well known to those skilled in the art and it is not therefore proposed to describe the circuit or its operation in detail. The green correction circuits of the invention are included in the block marked "matrix circuit" which in the figure receives input signals X and Z as shown and produces from these signals the red, green and blue colour difference signals which are applied to the respective guns of the three gun shadow mask cathode ray tube. In the example shown in the figure the matrix circuit could be exactly as shown in FIGURE 1 or could comprise an XZ matrix circuit together with the arrangement of FIGURE 2. Alternatively, the outputs from sub-carrier demodulation circuits may be other than the X and Z signals shown and may be the red and blue colour difference signals directly in which case the arrangement of FIGURE 3 would be included in the matrix circuits. Any of the green correction circuits described above may be used with a suitable matrix circuit in a receiver of the type shown in FIGURE 4 with suitable choice of the demodulation axes for the sub-carrier.

Moreover, the invention is not limited in its application to receivers for the N.T.S.C. signal but may equally well be applied to receivers for signals according to the SECAM and PAL systems.

What we claim is:

1. Colour television apparatus for providing electrical signals capable of reproducing a colour picture, comprising (a) a circuit in which are provided signals dependent on Y, R, G and B where Y is a signal representing the luminance and R, G, and B are signals representing the red, green, and blue components respectively, (b) means providing a further signal representing the difference between two of said signals Y, R, G and B, (c) means for clipping said further signal to provide a correcting signal, (d) means for adding said correcting signal to one of the signals R, G, and B to alter the colour balance of a picture reproduced from said first-mentioned signals.

2. Colour television apparatus for providing electrical signals capable of reproducing a colour picture, comprising, (a) a channel for a colour difference signal $(R^{1/\gamma}-Y)$ where Y is represented by $(aR+bB+cG)^{1/\gamma}$, and $a$, $b$ and $c$ are constants and R, B and G represent red, blue and green components of the scene, (b) a channel for a colour difference signal $(B^{1/\gamma}-Y)$, (c) a matrixing circuit for producing a signal representing a linear combination of said two two colour difference signals and approximating to $(G^{1/\gamma}-Y)$, (d) means for clipping one at least of said two colour difference signals to derive a correction signal, (e) means for combining said correction signal and said signal approximating to $(G^{1/\gamma}-Y)$ to increase the accuracy of the approximation.

3. Apparatus according to claim 2 wherein said clipping means comprises means for producing a first correcting signal component proportional to $(R^{1/\gamma}-Y)$ for values of $(R^{1/\gamma}-Y)$ in excess of a first threshold and constant for values of $(R^{1/\gamma}-Y)$ below said threshold, means for producing a second correcting signal proportional to $(B^{1/\gamma}-Y)$ for values of $(B^{1/\gamma}-Y)$ in excess of a second threshold and constant for values of $(B^{1/\gamma}-Y)$ below said second threshold, and means for combining said first and second correcting signal components to produce said correcting signal.

4. Apparatus according to claim 2 in which said clipping means is arranged to produce a correction signal which is proportional to $(B^{1/\gamma}-Y)$ for values of $(B^{1/\gamma}-Y)$ above a threshold and is constant for values of $(B^{1/\gamma}-Y)$ below said threshold.

5. Apparatus according to claim 4 wherein said threshold is dependent on the values of $(R^{1/\gamma}-Y)$ and $(G^{1/\gamma}-Y)$.

6. Apparatus according to claim 2 in which said clipping means is arranged to produce a correction signal which is proportional to $(R^{1/\gamma}-Y)$ for values of $(R^{1/\gamma}-Y)$ above a threshold and is constant for values of $(R^{1/\gamma}-Y)$ below said threshold.

7. Apparatus according to claim 6 wherein said clipping means is arranged to produce a signal proportional to $(R^{1/\gamma}-Y)$ or $(B^{1/\gamma}-Y)$ depending on which is the greater if the value of $(R^{1/\gamma}-Y)$ or $(B^{1/\gamma}-Y)$ is in excess of a threshold and is constant if the values of $(R^{1/\gamma}-Y)$ and $(B^{1/\gamma}-Y)$ are below said threshold.

8. Apparatus according to claim 6 wherein said threshold is dependent on the values of $(B^{1/\gamma}-Y)$ and $(G^{1/\gamma}-Y)$.

References Cited by the Examiner

UNITED STATES PATENTS

| | | | |
|---|---|---|---|
| 3,226,475 | 12/1965 | Percival | 178—5.4 |
| 3,246,078 | 4/1966 | James | 178—5.4 |

DAVID G. REDINBAUGH, *Primary Examiner.*

J. A. O'BRIEN, *Assistant Examiner.*